(12) United States Patent
Ooshima et al.

(10) Patent No.: US 6,815,037 B2
(45) Date of Patent: Nov. 9, 2004

(54) CARRIER MEMBER MADE OF A UV RESISTANT FIBER-REINFORCED COMPOSITE MATERIAL AND PROCESS FOR PRODUCING THEREOF

(75) Inventors: Akio Ooshima, Kanagawa (JP); Takashi Kobayashi, Kanagawa (JP); Kenichi Aoyagi, Kanagawa (JP); Daisuke Uchida, Tokyo (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 18 days.

(21) Appl. No.: 09/956,184

(22) Filed: Sep. 19, 2001

(65) Prior Publication Data

US 2003/0054131 A1 Mar. 20, 2003

(51) Int. Cl.$^7$ ................................. B32B 5/12
(52) U.S. Cl. ............... 428/113; 428/99; 428/293.4; 428/293.7; 428/294.1; 428/294.4; 428/294.7; 428/295.4; 428/296.1; 428/296.4; 428/297.4; 428/297.7; 428/298.1; 428/298.7; 294/49; 901/2
(58) Field of Search ....................... 428/113, 408, 428/99, 293.4, 293.7, 294.1, 294.4, 294.7, 295.4, 296.1, 296.4, 297.4, 297.7, 298.1, 298.7; 294/49; 901/2

(56) References Cited

U.S. PATENT DOCUMENTS

| | | | | |
|---|---|---|---|---|
| 4,767,656 A | * | 8/1988 | Chee et al. | 428/116 |
| 5,254,397 A | * | 10/1993 | Kawai et al. | 428/293.4 |
| 5,579,898 A | * | 12/1996 | Nakagawa et al. | 198/851 |
| 5,688,577 A | * | 11/1997 | Smith et al. | 428/113 |
| 6,189,286 B1 | * | 2/2001 | Seible et al. | 52/721.4 |
| 6,246,740 B1 | * | 6/2001 | Maruyama et al. | 206/362 |

FOREIGN PATENT DOCUMENTS

| | | |
|---|---|---|
| JP | 63-203765 | 8/1988 |
| JP | 08-288364 | 11/1996 |
| JP | 11-176904 | 7/1999 |
| JP | 11-246690 | 9/1999 |
| JP | 11-354608 | 12/1999 |
| JP | 2001-44259 | 2/2001 |

* cited by examiner

*Primary Examiner*—Alexander S. Thomas
*Assistant Examiner*—Jane Rhee
(74) *Attorney, Agent, or Firm*—Knobbe Martens Olson & Bear, LLP

(57) ABSTRACT

This invention provides a carrier member made of a UV resistant fiber-reinforced composite material where a UV resistant coating material is applied on the surface of the fiber-reinforced composite material and a process for producing thereof. A preferable fiber-reinforced composite material is a fiber-reinforced plastic or carbon fiber-reinforced carbon composite material. A UV resistant coating material is one or more selected from the group consisting of ceramics, cermets, metals and alloys. The carrier member is produced by coating the surface of the fiber-reinforced composite material with a UV resistant coating material by spraying. This carrier member is advantageous in that it can exhibit properties inherent to a fiber-reinforced composite material such as a light weight, higher rigidity and higher heat resistance and that it little contaminates a precision instrument material when being used in cleansing with UV.

9 Claims, 1 Drawing Sheet

CARRIER MEMBER MADE OF A UV RESISTANT FIBER-REINFORCED COMPOSITE MATERIAL AND PROCESS FOR PRODUCING THEREOF

BACKGROUND OF THE INVENTION (1) Field of the Invention

This invention relates to a carrier member made of a UV resistant fiber-reinforced composite material and a process for producing thereof. In particular, it relates to a member made of a carbon fiber-reinforced composite material suitable for carrying a precision instrument element such as a liquid crystal display and a silicone wafer and a process for producing thereof.

(2) Description of the Prior Art

Carbon fiber-reinforced plastics and carbon fiber-reinforced carbon composite materials have been used in, for example, sports and leisure goods such as a golf shaft, a fishing rod, a tennis racket and a ski stock; industrial and medical products such as an industrial robot member, a printing ink roll and a pressure vessel; repairing of a bridge; and repairing of a civil engineering structure. In particular, carbon fiber-reinforced carbon composite materials have been used as materials for, for example, a brake in an airplane, a brake in a rapid transit railway, an atomic reactor and a jet nozzle in a rocket.

As a liquid crystal display has become larger, a lightweight, rigid and heat-resistant CFRP has been gradually used, instead of a conventional metal material such as aluminum, as a carrying member for an industrial robot for carrying such a precision instrument.

Since most of precision instrument elements are extremely sensitive to contamination with oil, dust or dirt, irradiation of ultraviolet rays in a vacuum ultraviolet region has been employed for decomposing and cleansing organic materials in some processes. A carrying member made of a CFRP or C/C composite is organic so that it cannot be used as a carrying member in an apparatus employing UV irradiation in a vacuum ultraviolet region due to decomposition of a surface.

SUMMARY OF THE INVENTION

To solve the above problems, an objective of this invention is to provide a carrier member made of a fiber-reinforced composite material which tends not to contaminate a precision instrument element even when used in cleaning with UV while maintaining properties inherent to a fiber-reinforced composite material such as lightness, higher rigidity and heat resistance, as well as a process for producing thereof.

This invention discloses the followings.

1. A carrier member made of a UV resistant fiber-reinforced composite material comprising a UV resistant coating layer in the surface of the fiber-reinforced composite material.

2. The carrier member as described in above 1., wherein the UV resistant coating material consists of one or more materials selected from the group consisting of ceramics, cermets, metals and alloys.

3. The carrier member as described in above 2., wherein the UV resistant coating material has a thickness of 50 to 250 $\mu$m.

4. The carrier member as described in above 1., wherein the fiber-reinforced composite material consists of a fiber-reinforced plastic or carbon fiber-reinforced carbon composite material.

5. The carrier member as described in above 4., wherein the fiber-reinforced plastic or carbon fiber-reinforced carbon composite material comprises a plurality of layers comprising unidirectional reinforcing fibers; and the unidirectional reinforcing fibers in at least one layer are oriented within an angle range of −20° to +20° to a longitudinal direction of the carrier member while the unidirectional reinforcing fibers in the remaining at least one layer are oriented within an angle range of +75° to +90° and/or −75° to −90°.

6. The carrier member as described in above 5., wherein the fiber-reinforced plastic or carbon fiber-reinforced carbon composite material further comprises a layer comprising unidirectional reinforcing fibers oriented within an angle range of +30° to +60° and/or −30° to −60° to a longitudinal direction of the carrier member.

7. A process for producing a carrier member made of a UV resistant fiber-reinforced composite material comprising a step of coating the surface of the fiber-reinforced composite material with a UV resistant coating material by spraying or CVD.

8. The process for producing a carrier member as described in above 7., wherein the UV resistant coating material is made of one or more materials selected from the group consisting of ceramics, cermets, metals and alloys.

9. The process for producing a carrier member as described in above 7., wherein the fiber-reinforced composite material consists of a fiber-reinforced plastic or carbon fiber-reinforced carbon composite material.

10. The process for producing a carrier member as described in above 7., wherein before the coating step, the surface of the fiber-reinforced composite material is subjected to polishing, sandpaper polishing, ultrasonic treatment, plasma processing, corona processing or oxidant treatment.

DESCRIPTION OF SYMBOLS

1: Coupler

2: Pat mounting hole

DETAILED DESCRIPTION OF THE PREFERRED EMBODIMENTS

Figure 1:
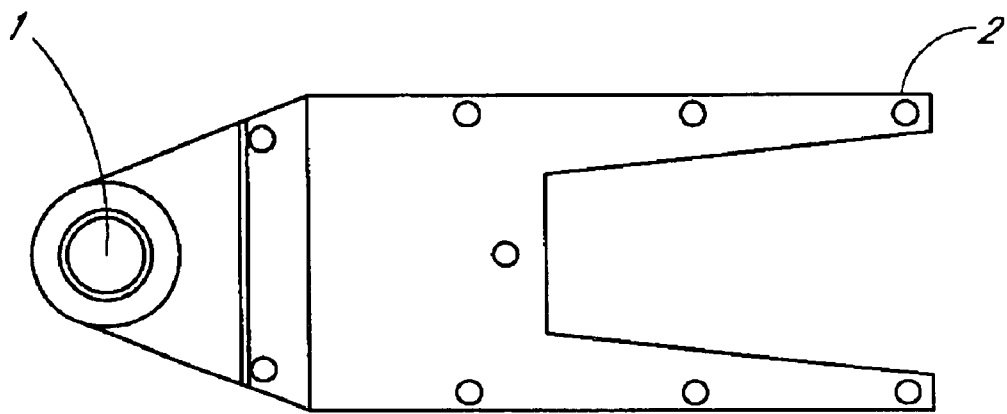
FIG. 1 shows an example of a primary carrier member made of a C/C composite prepared in Example 1.
Figure 2:
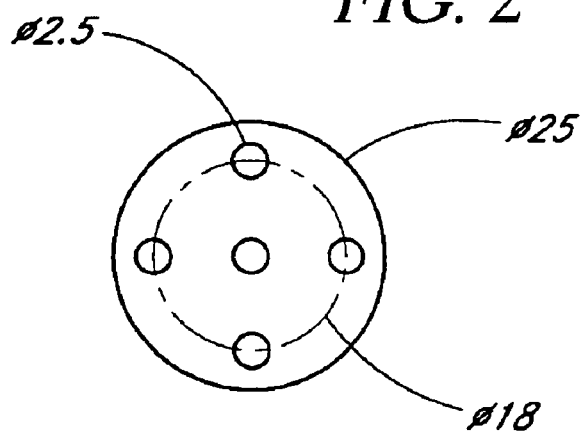
FIG. 2 is a partial enlargement of a pat mounting hole.

A UV resistant coating material used for coating a fiber-reinforced composite material in this invention may be any coating material which is UV resistant and UV impermeable.

The term "UV" or "ultraviolet rays" as used herein refers to a light having wave length of 100 to 280 nm; in particular, that having wave length of 100 to 260 nm which can easily decompose an organic compound and cart exhibit cleansing effect.

The term "UV resistant" as used herein means that a UV resistant coating material itself is not degenerated, decomposed, deteriorated, cracked or peeled after a UV irradiation test repeating 60 times irradiation of UV at 180 to 254 nm in the air atmosphere under the conditions of ambient temperature and pressure using six 25 W low-pressure mercury lamps with an irradiation time of 5 to 20 min for each run at a distance of 50 mm between the mercury lamps and a specimen (hereinafter, referred to as a "UV irradiation test").

The term "UV impermeable" means that a fiber-reinforced composite material as a matrix for a carrier member which is coated with a UV resistant coating material is not degenerated, decomposed or deteriorated after a UV irradiation test. In this invention, a coating material preferably cause little reduction in a bending strength of a fiber-reinforced composite material for a carrier member after UV irradiation test; specifically 80% or more, preferably 90% or more of a strength before the test.

In this invention, a "fiber-reinforced composite material" is a constituent material of a carrier member and a fiber-reinforced composite material before coating with a UV resistant coating material.

The term "a primary carrier member made of a fiber-reinforced composite material" as used herein refers to a fiber-reinforced composite material which has under gone a primary processing such as a cutting plane, a polished plane, an R processed plane, a hole-drilled plane and a recessed plane and which is a material before coating a UV resistant coating material.

The term "a carrier member made of a fiber-reinforced composite material" as used herein refers to a fiber-reinforced composite material (including a primary carrier member made of a fiber-reinforced composite material) which has been coated with a UV resistant coating material.

A thickness of a UV resistant coating used in this invention is preferably that whereby UV is impermeable to a fiber-reinforced composite material as a matrix; preferably 50 to 250 $\mu$m. A thickness less than 50 $\mu$m may cause uneven coating, leading to a partial insufficient thickness. A thickness more than 250 $\mu$m may disadvantageously increase a weight to make use of a light material insignificant and may lead to a higher cost.

A constituent material for a UV resistant coating material may be selected from the group consisting of ceramics, cermets (ceramics, metals and alloys), metals and alloys. The UV resistant coating material may have a laminated structure of two or more layers made of multiple constituent materials.

Examples of the ceramics include metal oxide ceramics such as alumina, spinel, mullite, alumina-titania, zirconia, chromia, titania and garnet; and metal carbide ceramics such as titanium carbide, chromium carbide and tungsten carbide.

Examples of the metals and the alloys include aluminum, silicon-aluminum, aluminum-chromium, copper, copper-nickel, aluminum-bronze, nickel, nickel/aluminide, nickel-aluminum/molybdenum, molybdenum and molybdenum/iron.

The cermet may be selected from the ceramics and the metals or the alloys as described above, each of which may be used alone or as a mixture of two or more.

For a mixing ratio of a cermet, 10 to 300 parts by weight of a metal or alloy may be used to 100 parts by weight of a ceramic.

Coating the surface of the fiber-reinforced composite material with the above UV resistant coating material should be conducted so carefully that a carrier member is not deteriorated by UV, the fiber-reinforced composite material is not exposed or a coating film formed is not adequately thin for UV permeation through the UV resistant coating material. In particular, uneven coating must be avoided.

Examples of a preferred coating method include plasma spraying, high-energy gas spraying and CVD (chemical vapor deposition), preferably plasma spraying and high-energy gas spraying, more preferably wire metallizing process, powder spraying, Rokide spraying process and Sfecord spraying process. When a film is formed by any of these methods, a UV resistant coating material such as alumina may become opaque to prevent UV from permeating.

A temperature of a surface to be sprayed during spraying with the coating material is preferably 50 to 200° C. If the temperature is less than 50° C., coating may be so inadequate that it tends to be detached. If it is higher than 200° C., a carbon fiber-reinforced plastic and/or carbon fiber-reinforced carbon composite material plate may be undesirably curved or deformed.

Before coating, a carrier member surface (the surface of the fiber-reinforced composite material) may be physically or chemically processed and modified to promote adhesiveness between the coating material and the carrier member It is particularly effective when employing a carbon fiber-reinforced plastic. Examples of physical processing include polishing, coarsening with a sand paper and ultrasonic treatment. Examples of chemical processing include partial oxidation of a surface, addition of a functional group on a surface, corona processing, plasma processing and oxidant treatment.

A primary member as a matrix in a carrier member made of a fiber-reinforced composite material has a part where, for example, carbon fibers are exposed by primary processing such as a cutting plane, a polished plane, an R processed plane, a hole-drilled plane and a recessed plane. After coating with a UV resistant coating material, a part of the above-mentioned surface may become coarse and thus it may be needed to smooth the part by polishing as second processing. In the polishing, for example, a diamond sandpaper may be preferably used.

Examples of a fiber-reinforced composite material which may be used in this invention include fiber-reinforced ceramics, fiber-reinforced carbon composite materials, fiber-reinforced metal composite materials and fiber-reinforced plastics (hereinafter, referred to as "FRPS"), preferably FRPs and carbon fiber-reinforced carbon composite materials (hereinafter, referred to as "C/C/composites"). Particularly preferable FRPs are carbon fiber-reinforced plastics (hereinafter, referred to as "CFRPs") in which carbon fibers are mainly used as reinforcing fibers.

Examples of a matrix which can be used for a fiber-reinforced composite material include thermosetting resins, thermoplastic resins, carbon, ceramics, metals and combinations of two or more thereof, preferably thermosetting resins, carbon and combinations of two or more thereof.

Examples of the thermosetting resins include epoxy resins, aramid resins, bismaleimide resins, phenol resins, furan resins, urea resins, unsaturated polyester resins, epoxyacrylate resins, diallylphthalate resins, vinyl ester resins, thermosetting polyimide resins and melamine resins.

Examples of thermoplastic resins include nylon resins, liquid crystal aromatic polyamide resins, polyester resins, liquid crystal aromatic polyester resins, polypropylene resins, polyether sulfone resins, polyphenylene sulfide resins, polyether ether ketone resins, polysulfone resins, polyvinyl chloride resins, vinylon resins, aramide resins and fluorocarbon resins.

Examples of the ceramics include, but not limited to, alumina, silica, titanium carbide, silicon carbide, boron nitride and silicon nitride.

Examples of the metals include, but not limited to, titanium, aluminum, tin, silicon, copper, iron, magnesium, chromium, nickel, molybdenum, tungsten and alloys made of at least one of these.

Examples of a reinforcing fiber include stainless steel fibers, copper fibers, nickel fibers, titanium fibers, tungsten fibers, silicon carbide fibers, alumina fibers, carbon fibers, titanium carbide fibers, boron nitride fibers, petroleum pitch carbon fibers, coal pitch carbon fibers, PAN carbon fibers, glass fibers, aramid fibers and boron fibers. Two or more selected from these may be used as fibers with a hybrid structure.

For a carrier member made of a fiber-reinforced composite material of this invention, carbon fibers may be preferably used as main reinforcing fibers because they may provide a light-weight and highly rigid molding. The carbon fibers may be, as appropriate, combined with glass fibers, aramid fibers, stainless steel fibers, copper fibers, nickel fibers, titanium fibers, tungsten fibers, silicon carbide fibers, alumina fibers, titanium carbide fibers, boron nitride fibers or other fibers.

The type of the above reinforcing fibers may be, but hot limited to, selected from one-dimensional, two-dimensional, three-dimensional and random reinforcement, appropriately depending on a purpose. For example, the reinforcing fibers may be used as short fibers, a woven fabric, a nonwoven fabric, a unidirectional material, a two-dimensional fabric or a three-dimensional fabric; more specifically, as a laminated material such as a felt, a matte, a braided cloth, a split fiber cloth, a pseudo-isotropic material, a plain weave material, a satin weave material, a twill weave material, a mock leno weave material and leno weave material.

In this invention, an FRP and a CFRP may be those prepared by common methods. For example, a reinforced fiber processed as described above is impregnated with a thermosetting resin to prepare a pre-preg. A plurality of the pre-pregs may be then laminated and cured to form an FRP. Among others, a suitable preparation method for this invention is to use laminates where unidirectional material fibers as reinforced fibers in each layer are appropriately oriented to, e.g., 0°, ±45° or 90° to provide a molding with a given elastic modulus.

As an example of the above lamination process, a skin and a core layers are formed. The skin layer comprises the first carbon fiber-reinforced plastic layer comprising the first carbon fibers which are oriented at an angle within a range of −20° to +20° to the longitudinal direction of a final carrier member and have an elongation modulus of 500 to 1000 GPa; and the second carbon fiber-reinforced plastic layer comprising the second carbon fibers which are oriented at an angle within a range of +75° to +90° and/or −75° to −90° to the above longitudinal direction and have an elongation modulus of 200 to 400 GPa. The core layer comprises the third carbon fibers which are oriented at an angle within a range of +30° to +60° and/or −30° to −60° to the longitudinal direction and have an elongation modulus of 500 to 1000 GPa. A proportion of the thickness of the skin layer is suitably 80 to 60% to the total thickness of the skin and the core layers. The core layer may comprise a core or may be, for example, a structure comprising voids in a shape of honeycomb, porous material or corrugate.

There are no restrictions to a method for impregnating the above reinforced fibers with a thermosetting resin, but a so-called hot-malt process may be preferably employed, where the reinforced fibers are impregnated with the resin while being generally heated to 60 to 90° C. A content of the thermosetting resin in the pre-preg prepared is generally 20 to 50% by weight, preferably 25 to 45% by weight to the total weight of the reinforced fibers and the resin.

To the resin, a filler may be added when desired. Examples of the filler include mica, alumina, talc, silica powder, wollastonite, sepiolite, basic magnesium sulfate, calcium carbonate, polytetrafluoroethylene powder, zinc powder, aluminum powder, and organic particles such as polyacrylate, epoxy resin, polyamide and polyurethane particles.

The pre-preg is finally formed into an FRP. For example, pre-pregs are laminated into a shape suitable to a carrier member and they are cured by heating generally at 110 to 150° C. for 30 min to 3 hours in an autoclave or using a press machine and the like to form an FRP. The FRP thus formed may exhibit stable properties and have little voids. Since a carrier member requires higher processing precision, the FRP can be further processed into a shape suitable to the carrier member.

A C/C composite in this invention may be also that prepared as usual. Specifically, a C/C composite which can be used may mainly comprise carbon fibers, but as described above, other reinforcing fibers such as glass fibers may be incorporated as appropriate.

Examples of a process for forming the above matrix include impregnating reinforcing fibers with a pitch, thermoplastic resin or thermosetting resin, and forming pyrolytic carbon by a technique such as chemical vapor deposition (CVD) and chemical vapor impregnation (CVI).

Examples of the pitch include coal-tar pitch, petroleum pitch and synthetic pitch. Isotropic pitch and mesophase pitch prepared from the above pitches may be used. Examples of the thermosetting resin include phenol resins, epoxy resins, furan resins and urea resin's.

A filler such as carbon powder, graphite powder, silicon carbide powder, silica powder, carbon fiber whisker, short carbon fibers and short silicon carbide fibers may be blended with the above pitch, thermosetting resin or thermoplastic resin, which is impregnated with the fibers.

A C/C composite may be prepared by impregnating carbon fibers processed as described above with a matrix resin such as a pitch and a phenol resin to form a preform, which is then subject to impregnation by, e.g., hot isostatic pressing (HIP) and carbonized into a C/C composite. Carbon fibers may be laminated such that they consist of a core and a skin layers using a unidirectional material as described for the FRP. The direction of the unidirectional material in each layer is preferably determined as described for the FRP.

Carbonization may be conducted by heating generally at 400 to 3500° C., preferably 500 to 3300° C. under an inert gas atmosphere.

The C/C composite thus prepared may be densified. Specifically, the composite repeatedly undergoes a matrix-forming process to increase a density of the composite material.

A carrier member made of a fiber-reinforced composite material may have a variety of shapes such as a plate, a rod, a fork, a honeycomb, a hollow rod, a T-shape, an I-shape, a curved plane and any combination thereof, depending on its use appropriately.

EXAMPLES

This invention will be described with reference to, but not limited to, Examples.

In these examples, a UV irradiation test was conducted by intermittently repeating irradiation of a sample with UV 60 times using six 25 W low-pressure mercury lamps having wavelength of 180 to 254 nm at a distance of 50 mm for 10 min at ambient temperature and pressure in the air.

Example 1

(1) Preparation of a Primary Carrier Member Made of a C/C Composite

Pitch carbon fibers with a tensile strength of 3500 MPa, an elongation modulus of 800 GPa and a thermal conductivity of 300 W/mK were aligned to one direction and then laminated. The laminate was impregnated with carbonaceous pitch and the laminate was then pressure-carbonized by heating at a pressure of 1 MPa and a temperature of 1000° C. The cycle of impregnation with carbonaceous pitch and pressure carbonization was repeated for compacting to prepare a unidirectionally reinforced C/C composite. The unidirectionally reinforced C/C composite was processed into a primary carrier member comprising a pad mounting hole with an inner diameter of 2.5 mm and a coupler mounting hole, whose dimensions were 1000 mm (Length)×380 mm (Width)×8 mm (Thickness). For adequate rigidity of the molding, the carbon fibers in the molding were oriented to A and B directions from a proximal side to a distal side.

The primary carrier member made of a C/C composite thus obtained exhibited a bulk density of 1.90 g/cm$^3$, a fiber volume content Vf=60%, an elongation modulus of 245 GPa, a thermal conductivity along the carbon fiber orientation direction of 400 W/mK and a thermal conductivity perpendicular to the carbon fiber orientation direction of 20 W/mK.

(2) Preparation of a UV Resistant Coating Material

A non-dust air gun was used to remove dusts on the surface of the above primary carrier member made of a C/C composite whose end had been subject to 2 mmR processing. Alumina powder with an average particle size of 5 μm was sprayed from a plasma spraying gun to form a coating of about 100 μm thickness such that there remained no exposed areas in the primary carrier member made of a C/C composite (matrix). The surface of the alumina-coated carrier member made of a C/C composite thus prepared was smoothed by polishing with #600, #1000 and #1600 diamond sandpapers.

(3) Test for UV Resistance

The alumina-sprayed carrier member made of a C/C composite was placed in a UV irradiation apparatus and then underwent a UV irradiation test. After irradiation, the sample was removed and observed. There have been observed no fine dusts; no changes such as deterioration and cracks in the UV resistant coating material; and no changes such as decomposition and deterioration in the C/C composite part as a matrix.

(4) Test for Mechanical Properties

A 0°/90° laminated plain weave fabric was impregnated with petroleum pitch to prepare a preform, which was then pressure-carbonized at 2000° C. using hot isostatic pressing to form a C/C composite with a Vf (fiber volume content) of 40% and a density of 1.62 g/cm$^3$. It was cut into test pieces with dimensions of 100 mm (Length)×15 mm (Width)×2 mm (Thickness). A test piece was plasma-sprayed with alumina to form a film to 20 μm. Thus, a carrier member made of a C/C composite was formed. After UV irradiation test, the member was determined for a bending strength. As a result, a bending strength for the member was 105 MPa before irradiation while being 104 MPa after irradiation, indicating no change in a bending strength.

Example 2

(1) Preparation of a Skin Layer

Pitch carbon fibers with an elongation modulus of 800 GPa were aligned to one direction and impregnated with a bismaleimide resin to prepare an unidirectional pre-preg sheet. Separately, PAN carbon fibers with an elongation modulus of 230 GPa were aligned to one direction and impregnated with a bismaleimide resin to prepare an unidirectional pre-preg sheet. A plurality of former sheets (i.e., that from pitch carbon fibers) and a plurality of latter sheets (i.e., that from PAN carbon fibers) were laminated while the former were aligned to have their reinforced direction of 0° (i.e., the same direction) and the latter were aligned to have their reinforced direction of 90° (i.e., the perpendicular direction), each to the above longitudinal direction. The lamination product was autoclaved to prepare a skin layer with a thickness of about 1.2 mm. In the skin layer, the volume contents were 75% and 25% for the former pre-preg from the pitch carbon fibers and the latter pre-preg from the PAN carbon fibers, respectively.

(2) Preparation of a Core Layer

Pitch carbon fibers with an elongation modulus of 600 GPa were aligned to one direction and impregnated with a bismaleimide resin to prepare an unidirectional pre-preg sheet. A plurality of the sheets were aligned and laminated such that their reinforced direction was at an angle of ±45° to the above longitudinal direction and a volume content of the pre-preg sheets in a core layer was 5%. Then, a plurality of pre-preg sheets made of glass fibers impregnated with a bismaleimide resin were laminated as the remaining part to prepare a core layer with a thickness of about 5.6 mm.

(3) Preparation of a Primary Carrier Member Made of an FRP

A sheet of the above core layer was sandwiched between two sheets of the above skin layer. On the surfaces of these skin layers was attached a carbon fiber fabric (satin fabric, thickness: 0.1 mm) with an elongation modulus of 230 GPa to form a cloth layer for providing a CFRP plate. In the CFRP plate were formed a mounting hole with an inner diameter of 6 mm, a vacuum pad mounting hole and a groove with a width of 6 mm and a depth of 2 mm, and then the plate was processed to give a primary carrier member made of a CFRP with dimensions of 1000 mm (Length)×100 mm (Width)×8.2 mm (Thickness).

(4) Preparation of a UV Resistant Coating Material

A non-dust air gun was used to remove dusts on the surface of the above primary carrier member made of a CFRP whose end had been subject to 2 mmR processing. Five micron alumina powder was sprayed from a plasma spraying gun to form a coating of about 100 μm thickness such that there remained no exposed areas in the primary carrier member made of a CFRP (matrix). The surface of the alumina-coated carrier member made of a CFRP thus prepared was smoothed by polishing with #600, #1000 and #1600 diamond sandpapers.

(5) Test for UV Resistance

The alumina-spray coated carrier member made of a CFRP was placed in a UV irradiation apparatus and then underwent a UV irradiation test. After irradiation, the sample was removed and observed. There have been observed no fine dusts; no changes such as deterioration and cracks in the UV resistant coating material; and no changes such as decomposition and deterioration in the CFRP part as a matrix.

(6) Test for Mechanical Properties

Carbon fibers with an elongation modulus of 235 GPa and an elongation strength of 3.53 GPa was impregnated with a 350° F.-setting epoxy resin composition to prepare a unidirectional pre-preg with a Vf of 60%. A plurality of the pre-pregs were laminated, cured at 180° C. for 2 hours, cut into test pieces with dimensions of 100 mm (Length)×15 mm (Width)×2 mm (Thickness). A test piece was plasma-sprayed with alumina to prepare a carrier member made of a CFRP coated with a film with a thickness of 20 μm.

After UV irradiation test, the member was determined for a bending strength. As a result, a bending strength for the member was 750 MPa before irradiation while being 748 MPa after irradiation, indicating no change in a bending strength.

Comparative Example 1

An ambient-temperature setting ceramic coating material (Skymic SRC Clear (Osaka Organic Industries)/setting agent=100/10 ratio by weight) was applied to 30 µm on a primary carrier member made of a CFRP prepared as described in Example 2, which was then cured at 50° C. for 1 hour.

The carrier member made of a CFRP was placed in a UV irradiation apparatus and was subject to a UV irradiation test. After irradiation, the surface of the member was observed. The coating on the surface was completely removed and the matrix resin in the CFRP part and a part of the CF were damaged by UV.

As described above, a carrier member made of a fiber-reinforced composite material according to this invention (in particular, CFRP and/or C/C composite) can adequately exhibit properties inherent to a carrier member made of a fiber-reinforced composite material, i.e., a light weight, higher heat resistance and higher rigidity without contamination of a precision instrument with carbon fibers. Furthermore, according to a process for producing a carrier member made of a fiber-reinforced composite material, a surface after processing of a UV resistant coating material is smooth and the carrier member is not curved or deformed.

What is claimed is:

1. An industrial robot's carrier member having a plate-shape or a fork-share configured to carry a precision instrument element subjected to ultraviolet (UV) light cleaning, comprising:

a fiber-reinforced composite material as a primary carrier member, said fiber-reinforced composite material being a fiber-reinforced plastic; and a UV resistant coating layer formed as an outmost layer on a surface of the fiber-reinforced composite material, said coating layer having a smooth surface and an even thickness of 50 to 250 µm, said coating layer being made of a material selected from the group consisting of ceramics and cermets and formed on the surface at a temperature of about 50° C. to about 200° C., said coating layer having UV resistance as measured by a UV irradiation test of repeating irradiation of UV at 180–254 nm 60 times.

2. The carrier member according to claim 1 wherein the fiber-reinforced plastic comprises a plurality of layers comprising unidirectional reinforcing fibers; and the unidirectional reinforcing fibers in at least one layer are oriented within an angle range of −20° to +20° to a longitudinal direction of the carrier member while the unidirectional reinforcing fibers in the remaining at least one layer are oriented within an angle range of +75° to +90° and/or −75° to −90°.

3. The carrier member according to claim 2 wherein the fiber-reinforced plastic further comprises a layer comprising unidirectional reinforcing fibers oriented within an angle range of +30° to +60° and/or −30° to −60° to a longitudinal direction of the carrier member.

4. The carrier member according to claim 1, wherein the fiber-reinforced composite material comprises:

a skin layer including: (i) a first carbon fibers oriented within an angle range of −20° to +20° to a longitudinal direction of the carrier member and having an elongation modulus of 500 to 1000 GPa; (ii) a second carbon fibers oriented within an angle range of +75° to +90° and/or −75° to −90° to the longitudinal direction and having an elongation modulus of 200 to 400 GPa, wherein the first carbon fibers and the second carbon fibers are impregnated with a thermosetting resin; and a core layer including a third carbon fibers oriented within an angle range of +30° to +60° and/or −30° to −60° to the longitudinal direction and having an elongation modulus of 500 to 1000 GPa.

5. The carrier member according to claim 4, wherein the skin layer has a thickness of 60–80% of the thickness of the fiber-reinforced composite material.

6. The carrier member according to claim 4, wherein the fiber-reinforced composite comprises the thermosetting resin in an amount of 20–50% by weight.

7. The carrier member according to claim 1, wherein the smooth surface of the coating layer is a diamond sandpaper-treated surface.

8. The carrier member according to claim 1, wherein the fiber-reinforced composite material comprises a thermosetting resin selected from the group consisting of phenol resins, epoxy resins, furan resins, and urea resins.

9. An industrial robot's carrier member having a plate-shape or a fork-shape configured to carry a precision instrument element, comprising:

a fiber-reinforced plastic; and a coating layer formed as an outmost layer on a surface of the fiber-reinforced plastic for protecting the surface from ultraviolet (UV) irradiation, said coating layer being made of ceramics or cermets having a smooth surface and an even thickness of 50 to 250 µm.

* * * * *